United States Patent

Rayces

[11] 3,926,505
[45] Dec. 16, 1975

[54] ALL SPHERICAL SOLID CATADIOPTRIC SYSTEMS

[75] Inventor: Juan L. Rayces, Santa Ana, Calif.

[73] Assignee: The Perkin-Elmer Corporation, Norwalk, Conn.

[22] Filed: July 22, 1974

[21] Appl. No.: 490,524

[52] U.S. Cl. .............................. 350/201; 350/201
[51] Int. Cl.² ........................................ G02B 17/06
[58] Field of Search ................. 350/201, 29, 199

[56] References Cited
UNITED STATES PATENTS

| | | | |
|---|---|---|---|
| 2,229,302 | 1/1941 | Martin et al. ........................ | 350/201 |
| 3,191,497 | 6/1965 | Matsui .............................. | 350/199 |
| 3,700,310 | 10/1972 | Rayces .............................. | 350/201 |

*Primary Examiner*—Paul A. Sacher
*Attorney, Agent, or Firm*—S. A. Giarratana; F. L. Masselle; J. K. Conant

[57] ABSTRACT

An improved catadioptric objective system including a rear support element having a concave primary mirror thereon at one end, a middle support element and a front support element having a convex secondary mirror thereon at the other end, in which the support elements are arranged so that rays reflected by the primary mirror go through two glass-to-air and air-to-glass refractions before reaching the secondary mirror, to correct zonal spherical aberrations in combination with other parameters of the lens.

17 Claims, 3 Drawing Figures

ALL SPHERICAL SOLID CATADIOPTRIC SYSTEMS

BACKGROUND OF THE INVENTION

The present invention relates to catadioptric systems useful for photographic objectives in general and more particularly, to an improved catadioptric optical system having reduced zonal spherical aberrations.

In U.S. Pat. No. 3,547,525, an optical system for use as a photographic objective and having a concave primary mirror at one end of a solid support assembly and a convex secondary mirror located at the other end of the support assembly is disclosed. Both mirrors are spherical with the support assembly made of refractive material contituting the only medium through which light reflected by the primary mirror is transmitted to the secondary mirror. Light reflected by the secondary mirror passes through a central aperture in the primary mirror and additional refractive components are provided located in front of the primary mirror and behind the second mirror which cooperate with the refractive support assembly to correct aberrations and/or increase the effective focal length of the system. In addition, in combination with these other elements, an axially movable doublet for changing the focus of the system is provided. In that patent, the advantages of such a catadioptric system are disclosed. Although the disclosed arrangement provided an excellent photographic objective, it requires the inclusion of at least one aspheric surface to provide necessary corrections due to the severe non-linearities inherent in catadioptric systems.

In my U.S. Pat. No. 3,700,310, I disclose an improved compact catadioptric apochromat system which avoids the need of aspheric surfaces as required in the optical system of U.S. Pat. No. 3,547,525. Apochromatism is achieved by making both the positive lens of the front afocal doublet and the refractive support of the same material whose refractive index differs by a relatively large amount (on the order of 17%) from the refractive index of the material from which the negative lens of the doublet is made but whose dispersive power [V Number] is substantially the same as the material of this negative lens, i.e., differing by less than 1%. Consequently, apochromatism is achieved entirely with rather shallow [long radius] spherical surfaces which avoid the introduction of zonal spherical aberration and hence the necessity for aspherical surfaces.

Although the solution to the problem described in my previous patent works quite well, it suffers from the disadvantage that expensive lanthanum flint glass is required to meet the above-noted requirements for removal of zonal spherical aberrations. Thus, based on the teaching of these prior art patents, one must either use aspherical surfaces, increasing manufacturing costs or use lanthanum flint glass increasing material cost. In view of this, the desirability of a catadioptric objective which provides for the correction of zonal spherical aberration but uses only spherical surfaces and does not require special expensive glass is evident.

SUMMARY OF THE INVENTION

The present invention provides such a catadioptric objective. In a catadioptric objective such as described at the outset, this is accomplished by having the rays reflected by the primary mirror go through two glass-to-air and air-to-glass refractions before reaching the secondary mirror rather than going all the way through pieces of glass cemented to one another. These refractions, not present in the prior art, permit the correction of zonal spherical aberrations when used in combination with the other parameters of the lens.

Three examples of embodiments of the invention are disclosed. The first is a 700mm $f/11$ lens intended primarily for use as an objective for photographic cameras. The second, also useful as an objective for a photographic camera, e.g., a 35 mm camera, is a 600 mm, $f/8$ lens. The third example is a 120 mm, $f/1.8$ lens useful with a television camera. Each of the lens exhibit excellent correction of axial aberration and offaxis aberration.

DETAILED DESCRIPTION OF PREFERRED EMBODIMENT

Figure 1:
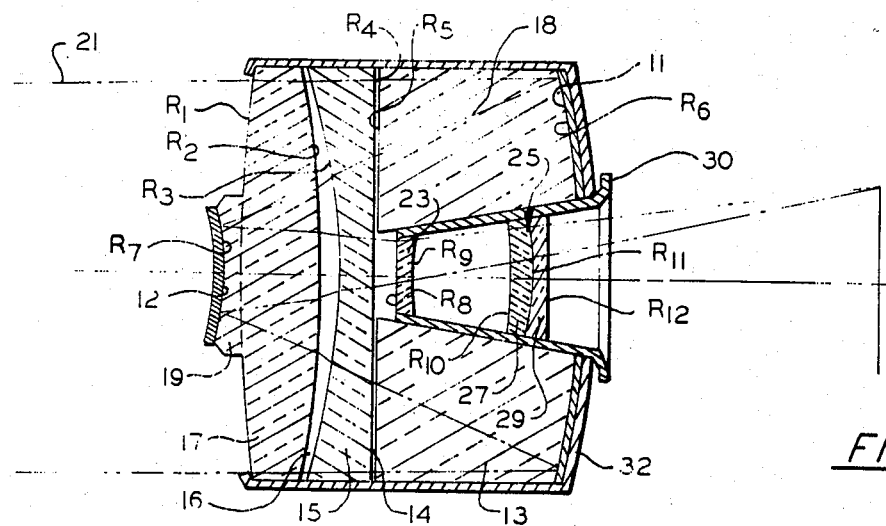
FIG. 1 illustrates a first embodiment of the invention useful as a photographic objective for 35mm. cameras.

FIG. 1 illustrates a first embodiment of the invention, useful as a photographic objective for 35 mm cameras. The illustrated catadioptric system includes a primary mirror 11 and a secondary mirror 12. Primary mirror 11 is concave and spherical and faces the object. Throughout the following description the direction of the object will be referred to as the front. The primary mirror is formed directly on the rear surface of a solid rear support element 13. Support element 13 includes a longitudianl coaxially aligned aperture extending inwardly from the rear. The front surface of the support element 13 is separated from an intermediate support element 15 by an air space 14. This is in contrast to previously disclosed lenses of this nature in which the second element 15 was preferably comented to an element such as element 13 [or these elements were constructed as a single piece of glass]. The front surface of support element 13 has a radius R5 and the rear surface of element 15 a radius R4. The difference between these two radii is quite small as will be seen presently; however, they are not identical and it is essential that the elements 13 and 15 not be cemented together for optimum aberration correction. The front of element 15 is concave, having a radius R3. In front of intermediate support element 15 is a front support element 17. Again, support element 17 is separated from support element 15 by an air space 16. In previous systems, a portion of these two elements was separated to form an afocal doublet. However, the portion through which the reflected ray 18 passed previously was solid, i.e., in effect the elements 15 and 17 were cemented together at this point.

On the front surface of element 17 and preferably cemented thereto for convenience in fabrication and mounting is an element 19. As shown, element 15 has a concave front surface of radius R3. Element 17 is a positive lens having a convex rear surface of radius R2 and a convex front surface of radius R1. Element 19 has a concave rear surface also of radius R1 and a concave front surface of radius R7 on which the mirror 12 is formed.

Elements 13, 15, 17 and 19 are made of the same glass or optical material. A ray 21 entering the system passes through the elements 17, 15 and 13 in that order to the primary mirror 11 from which it is reflected passing back through the element 13 then in sequence through a glass-to-air and air-to-glass refraction into the element 15 and then through another glass-to-air and air-to-glass refraction into the element 17. The ray passes through elements 17 and 19 and then to secondary mirror 12 from which it is reflected back through the elements 19, 17 and, with a glass-to-air and air-to-glass refraction, passes through and exits from element 15.

In a manner similar to the prior art systems, the optical system of the present invention also includes a lens element 23 and a doublet 25 made up of positive element 27 and negative element 29. These are both located in the axial aperture of the element 13. Lens element 23 and doublet 25, which serve to increase the focal length and correct for field aberrations, are mounted on a support 30 so as to be axially movable relative to the main support 32 for purposes of focusing. Support for the lens system is essentially the same as described in the above referenced patents. Main support 32 around all the optical elements maintains positioning between the elements. It will be recognized that doublet 25 constitutes what is known as a Barlow lens increasing the telephoto ratio and locating the focal plane at a convenient distance behind the lens barrel. Elements 27 and 29 can be, and normally are, cemented together to form doublet 25 which is independently achromatized by use of crown and flint glass in a manner wellknown in the art.

As is evident from an examination of the path of the light rays 21 and 18 through the system, rays are reflected once at each of surfaces R6 and R7, viz., the primary and secondary mirrors 11 and 12 respectively, and are refracted once at surface R1 of element 17 and at surfaces R8 through R11, the surfaces of lens 23 and doublet 25. Rays are refracted twice at surface R5 and three times at surfaces R2, R3 and R4. In general terms, the marginal spherical aberration and comma introduced by the reflecting surfaces are corrected by the first refraction of light rays at surfaces R1 through R5 while the zonal aberration is corrected by the second refraction at surfaces R5, R4, R3 and R2. The third refraction, at surfaces R2, R3 and R4, does not affect correction to any great extent. Off-axis aberrations are corrected primarily by appropriate bending and distribution of power of the elements 23,27 and 29. Longitudinal and lateral chromatic aberrations are corrected through the use of one type of glass for the elements 13, 15, 17, 19 and 23 although, as previously mentioned, crown and flint glass is used in the Barlow doublet (25). In Table 1 below, the values for the lens of FIG. 1 are listed. As is well known in the art, a plus sign is used to denote that a surface is convex to the object and that a distance is measured from left to right whereas a minus sign is used to denote that a surface is concave to the object and that a distance is measured from right to left. Certain elements are listed more than once, the table following the sequence encountered by a ray of light 21 passing through the system.

TABLE I

Focal length - 700mm
Relative aperture - f/11
Field of view - 5°
Over all length - 2.1298 in.

| Element | Radius | Thickness | Spacing | Index | V No | Axial Distance |
|---|---|---|---|---|---|---|
| 17 | R1 11.3527 | .5002 | | 1.517 | 64.2 | 0.0000 |
| | R2 −7.5741 | | .1221 | | | .5002 |
| 15 | R3 −4.1486 | .2513 | | 1.517 | 64.2 | .6224 |
| | R4 −45.2694 | | 0.0000 | | | .8736 |
| 13 | R5 99999.9999 | 1.3504 | | 1.517 | 64.2 | .8736 |
| | R6 −6.0985 | −1.3504 | | | | 2.2240 |
| | R5 99999.9999 | | 0.0000 | | | .8736 |
| 15 | R4 −45.2694 | .2517 | | 1.517 | 64.2 | .8736 |
| | R3 −4.1486 | | −.1221 | | | .6219 |
| 17 | R2 −7.5741 | −.6295 | | 1.517 | 64.2 | .4998 |
| 19 | R7 −1.8406 | −.6295 | | 1.517 | 64.2 | −.1297 |
| 17 | R2 −7.5741 | | .1221 | | | .4998 |
| 15 | R3 −4.1486 | .2517 | | 1.517 | 64.2 | .6219 |
| | R4 −45.2694 | | .1410 | | | .8736 |
| 23 | R8 −9.9048 | .1000 | | 1.517 | 64.2 | 1.0146 |
| | R9 .9124 | | .6257 | | | 1.1146 |
| 27 | R10 −3.6354 | .1500 | | 1.673 | 32.2 | 1.7403 |
| 29 | R11 −1.2940 | .1098 | | 1.517 | 64.2 | 1.8903 |
| | R12 −17.7007 | | | | | 2.0001 |
| | Image Surface | | 2.1637 | | | 4.1038 |

This lens does show a residual sphero-chromatism- (i.e., chromatic variation of spherical aberration) limiting its use to a spectral band from 5,461 to 6,563 Angstron units.

Figure 2:
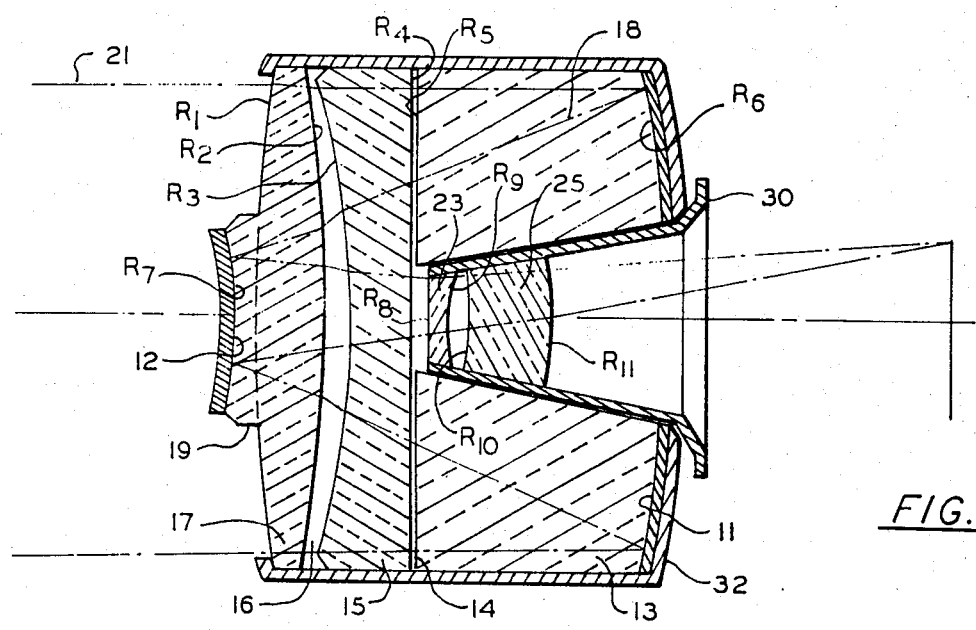
FIG. 2 is a second embodiment of the invention which shows a 600mm., $f/8$ lens also useful as the objective in a photographic camera.

A second embodiment of the invention is illustrated by FIG. 2 which shows a 600 mm., f/8 lens also useful as the objective in a photographic camera. As the FIG. 1 and FIG. 2 embodiments are similar in physical configuration, corresponding parts are identified with identical reference characters.

Insofar as visible differences are concerned, FIG. 1 and FIG. 2 embodiments are identical except that the doublet 25 of the former is replaced by a single lens 25. In addition, to permit use of the lens over a broader spectral band [from 4,861 to 6,563 angstrom units], elements 13, 15, 17 and 19 of FIG. 2 are not made of the same glass but rather of different glasses having approximately, but not necessarily, the same refractive index but having different dispersions. Elements 17 and 19 are selected to have a high V number, element 15 a medium V number and element 13 a low V number. This permits the additional correction of spherochromatism resulting in a broader useful spectral band. A table of values for the system of FIG. 2 is given below in Table 2.

TABLE 2

Focal length - 600mm
Relative aperture - f/8
Field of view - 4°
Overall length - 2.801 in.

| Element | Radius | Thickness | Spacing | Index | V No. | Axial Distance |
|---|---|---|---|---|---|---|
| 17 | R1 12.7443 | .4270 |  | 1.643 | 58.0 | 0.0000 |
|  | R2 −9.5052 |  | .1780 |  |  | .4270 |
| 15 | R3 −5.3048 | .4270 |  | 1.650 | 39.2 | .6050 |
|  | R4 −58.6571 |  | 0.000 |  |  | 1.0320 |
| 13 | R5 99999.9999 | 1.6470 |  | 1.648 | 33.9 | 1.0320 |
|  | R6 −7.6039 | 1.6470 |  | 1.648 | 33.9 | 2.6790 |
|  | R5 99999.9999 |  | 0.0000 |  |  | 1.0320 |
| 15 | R4 −58.6571 | −.4270 |  | 1.650 | 39.2 | 1.0320 |
|  | R3 −5.3048 |  | −.1780 |  |  | .6050 |
| 17 | R2 −9.5052 | −.5490 |  | 1.643 | 58.0 | .4270 |
| 19 | R7 −2.4469 | −.5490 |  | 1.643 | 58.0 | −.1220 |
| 17 | R2 −9.5052 |  | .1780 |  |  | .4270 |
| 15 | R3 −5.3048 | .4270 |  | 1.650 | 39.2 | .6050 |
|  | R4 −58.6571 |  | .1010 |  |  | 1.0320 |
| 23 | R8 −21.1769 | .1220 |  | 1.667 | 48.4 | 1.1330 |
|  | R9 1.2838 |  | .0934 |  |  | 1.2550 |
| 25 | R10 −2.5439 | .5459 |  | 1.667 | 48.4 | 1.3484 |
|  | R11 −2.0602 |  | 2.7396 |  |  | 1.8943 |
|  | Image Surface |  |  |  |  | 4.6339 |

Figure 3:
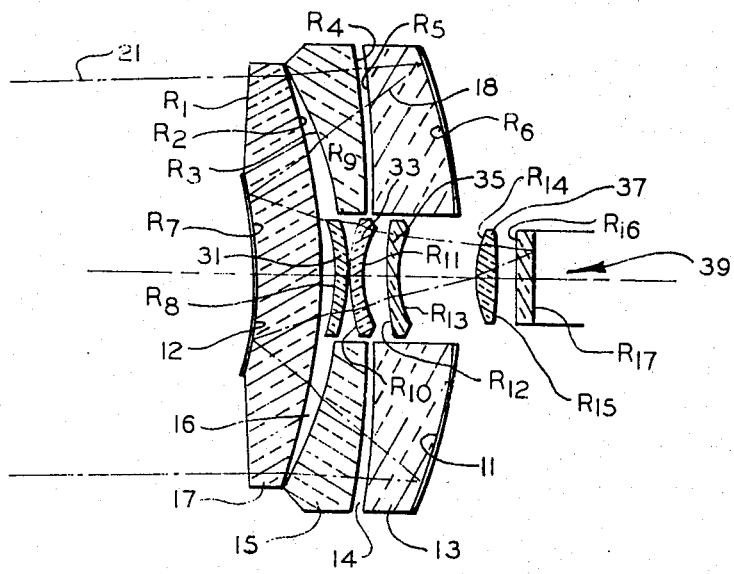
FIG. 3 is a third embodiment of the invention which shows a 120mm, $f/1.8$ lens for use in a television camera.

A third embodiment of the invention is illustrated on FIG. 3. Again, corresponding parts are given identical reference numerals, where applicable. In the lens system of FIG. 3, which is a 120 mm, f/1.8 lens for use in a television camera, element 19 of FIG. 1 is not provided but instead a reflective concave surface on the center portion of the element 17 forms secondary mirror 12. The axial aperture extends through both the element 13 and element 15. A positive lens 31 and two additional negative lenses 33 and 35 are provided along with a positive lens 37 to focus the image on the face of a television pick up tube 39.

A table of values for the system of FIG. 3 is given below in Table 3.

TABLE 3

Focal length - 120mm
Relative aperture - f/1.8
Field of view - 4°
Overall length - 1.8667 in

| Element | Radius | Thickness | Spacing | Index | V No. | Axial Distance |
|---|---|---|---|---|---|---|
| 17 | R1 24.3108 | .4841 |  | 1.667 | 48.4 | 0.0000 |
|  | R2 −4.0544 |  | .1263 |  |  | .4841 |
| 15 | R3 −2.6255 | .1988 |  | 1.658 | 50.9 | .6104 |
|  | R4 −10.8591 |  | .0005 |  |  | .8092 |
| 13 | R5 −17.8161 | .5958 |  | 1.667 | 48.4 | .8097 |
|  | R6 −4.0147 | .5958 |  |  |  | 1.4055 |
|  | R5 −17.8161 |  | −.0005 |  |  | .8097 |
| 15 | R4 −10.5891 | −.1988 |  | 1.658 | 50.9 | .8092 |
|  | R3 −2.6255 |  | −.1263 |  |  | .6104 |
| 17 | R2 −4.0544 | −.4006 |  | 1.667 | 48.4 | .4841 |
|  | R7 −2.9580 | .4006 |  |  |  | .0835 |
|  | R2 −4.0544 |  | .1116 |  |  | .4841 |
| 31 | R8 −.9081 | .0783 |  | 1.677 | 48.4 | .5957 |
|  | R9 −.9961 |  | .0004 |  |  | .6739 |
| 33 | R10 1.4767 | .0772 |  | 1.667 | 48.4 | .6743 |
|  | R11 .5603 | .5603 | .2005 |  |  | .7516 |
| 33 | R12 1.7875 | .0500 |  | 1.668 | 41.9 | .9521 |
|  | R13 .5542 |  | .5207 |  |  | 1.0021 |
| 37 | R14 .6539 | .1000 |  | 1.658 | 57.3 | 1.5228 |
|  | R15 −1.8453 |  | .1439 |  |  | 1.6228 |
| 39 | R16 99999.9999 | .1000 |  | 1.487 | 70.4 | 1.7667 |
|  | R17 99999.9999 |  | −.0000 |  |  | 1.8667 |
|  | Image Surface |  |  |  |  | 1.8067 |

Thus improved arrangements of a compact catadioptric system in which additional glass-to-air and air-to-glass refractions are used for the correction of zonal spherical aberrations have been shown. Although specific embodiments have been illustrated and described, it will be obvious to those skilled in the art that various modifications may be made without departing from the spirit of the invention which is intended to be limited solely by the appendant claims.

What is claimed is:

1. A compact catadioptric system comprising, in axial alignment:
   a. a front solid refractive support element 17 having a generally convex front surface and a convex rear surface and including, on the central portion of its front surface, a concave portion;
   b. an intermediate refractive support element 15 separated from said front support element by a first axial air space in the shape of a positive meniscus, said intermediate support element having a front concave surface;
   c. a rear solid refractive support element 13 separated from said intermediate support element by a second axial air space, said rear support element having a rear convex surface;

d. a first spherical internal reflecting surface comprising an annular convergent reflecting surface on the rear end of said rear support element; and e. a second spherical internal reflecting surface in the form of a circular divergent surface on the concave portion of said front support element to receive light from the convergent reflecting surface and reflect said light through an opening in said annular reflecting surface.

2. The system of claim 1 wherein all surfaces of said elements are spherical surfaces.

3. The system of claim 2 wherein at least said rear support element has a central aperture extending inwardly from the rear and further including lens means in said aperture for increasing the focal length of the system and correcting aberration.

4. The system of claim 3 wherein the respective radii of surfaces of said intermediate and rear support elements adjoining said second air space differ from one another.

5. The system of claim 1 wherein said front refractive support element comprises a portion of larger diameter 17 and a portion of smaller diameter 19 projecting forwardly from the front end of said portion of larger diameter, said projecting portion having said concave surface thereon.

6. The system of claim 5 in which said lens means comprise, in axial alignment from front to rear, a negative lens (23) and a positive lens (25).

7. The system of claim 6 further characterized by the following construction data, (presented in Table 2 at the preceeding specification.) the odd numbered radii, R, being the radii of the front surfaces of the elements designated and the even numbered radii being the radii of their rear surfaces:

Focal length – 600mm
Relative aperture – f/8
Field of view – 4°
Overall length – 2.801 in.

| Element | Radius | Thickness | Spacing | Index of Refraction | Dispersion (V No.) | Axial Distance |
|---|---|---|---|---|---|---|
| 17 | R1 12.7443 | .4270 | | 1.643 | 58.0 | 0.0000 |
| | R2 −9.5052 | | .1780 | | | .4270 |
| 15 | R3 −5.3048 | .4270 | | 1.650 | 39.2 | .6050 |
| | R4 −58.6571 | | 0.0000 | | | 1.0320 |
| 13 | R5 99999.9999 | 1.6470 | | 1.648 | 33.9 | 1.0320 |
| | R6 −7.6039 | 1.6470 | | 1.648 | 33.9 | 2.6790 |
| | R5 99999.9999 | | 0.0000 | | | 1.0320 |
| 15 | R4 −58.6571 | −.4270 | | 1.650 | 39.2 | 1.0320 |
| | R3 −5.3048 | | −.1780 | | | .6050 |
| 17 | R2 −9.5052 | −.5490 | | 1.643 | 58.0 | .4270 |
| 19 | R7 −2.4469 | −.5490 | | 1.643 | 58.0 | −.1220 |
| 17 | R2 −9.5052 | | .1780 | | | .4270 |
| 15 | R3 −5.3048 | .4270 | | 1.650 | 39.2 | .6050 |
| | R4 −58.6571 | | .1010 | | | 1.0320 |
| 23 | R8 −21.1769 | .1220 | | 1.667 | 48.4 | 1.1330 |
| | R9 1.2838 | | .0934 | | | 1.2550 |
| 25 | R10 −2.5439 | .5459 | | 1.667 | 48.4 | 1.3484 |
| | R11 −2.0602 | 2.7396 | | | | 1.8943 |
| | Image Surface | | | | | 4.6339 |

8. The system of claim 7 wherein said front support element is of a first optical material having a high V number, said intermediate element of a second material having a medium V number and said rear support element of a third optical material having a low V number.

9. The system of claim 6 wherein said positive lens is a cemented doublet (27,28) the system being further characterized by the following construction data in which the odd numbered radii, R, are the radii of the front surfaces of the elements designated and the even numbered radii are the radii of their rear surfaces:

Focal length – 600mm
Relative aperture – f/8
Field of view – 4°
Overall length – 2.801 in.

| Element | Radius | Thickness | Spacing | Index of Refraction | Dispersion (V No.) | Axial Distance |
|---|---|---|---|---|---|---|
| 17 | R1 12.7443 | .4270 | | 1.643 | 58.0 | 0.0000 |
| | R2 −9.5052 | | .1780 | | | .4270 |
| 15 | R3 −5.3048 | .4270 | | 1.650 | 39.2 | .6050 |
| | R4 −58.6571 | | 0.0000 | | | 1.0320 |
| 13 | R5 99999.9999 | 1.6470 | | 1.648 | 33.9 | 1.0320 |
| | R6 −7.6039 | 1.6470 | | 1.648 | 33.9 | 2.6790 |
| | R5 99999.9999 | | 0.0000 | | | 1.0320 |
| 15 | R4 −58.6571 | −.4270 | | 1.650 | 39.2 | 1.0320 |
| | R3 −5.3048 | | −.1780 | | | .6050 |
| 17 | R2 −9.5052 | −.5490 | | 1.643 | 58.0 | .4270 |
| 19 | R7 −2.4469 | −.5490 | | 1.643 | 58.0 | −.1220 |
| 17 | R2 −9.5052 | | .1780 | | | .4270 |
| 15 | R3 −5.3048 | .4270 | | 1.650 | 39.2 | .6050 |
| | R4 −58.6571 | | .1010 | | | 1.0320 |
| 23 | R8 −21.1769 | .1220 | | 1.667 | 48.4 | 1.1330 |
| | R9 1.2838 | | .0934 | | | 1.2550 |
| 25 | R10 −2.5439 | .5459 | | 1.667 | 48.4 | 1.3484 |
| | R11 −2.0602 | 2.7396 | | | | 1.8943 |
| | Image Surface | | | | | 4.6339 |

10. The system of claim 9 wherein said front support element, intermediate support element and rear support element are of the same optical material.

11. The system of claim 1 wherein the concave surface on said front element is formed directly on the surface thereof, and wherein both said intermediate and rear support elements contain a central aperture therethrough, extending inwardly from the rear.

12. The system of claim 11 wherein said lens means comprise, in axial alignment from front to rear, a positive lens (31), a first negative lens (33), and a second negative lens (35).

13. The system of claim 12 further including in axial alignment from front to rear behind said lens means, a positive lens (37) and television tube image surface (39).

14. The system of claim 13 wherein said system is characterized by the following construction data in which the odd numbered radii, R, are the radii of the front surfaces of the elements designated and the even numbered radii are the radii of their rear surfaces:

Focal length – 120mm
Relative aperture – f/1.3
Field of View – 4°
Overall length – 1.8667 in.

| Element | Radius | Thickness | Spacing | Index of Refraction | Dispersion (V No.) | Axial Distance |
|---|---|---|---|---|---|---|
| 17 | R1 24.3108 | .4841 | | 1.667 | 48.4 | 0.0000 |
| | R2 −4.0544 | | .1263 | | | .4841 |
| 15 | R3 −2.6255 | .1988 | | 1.658 | 50.9 | .6104 |
| | R4 −10.8591 | | .0005 | | | .8092 |
| 13 | R5 −17.8161 | .5958 | | 1.667 | 48.4 | .8097 |
| | R6 −4.0147 | .5958 | | | | 1.4055 |
| | R5 −17.8161 | | −.0005 | | | .8097 |
| 15 | R4 −10.5891 | −.1988 | | 1.658 | 50.9 | .3092 |
| | R3 −2.6255 | | −.1263 | | | .6104 |
| 17 | R2 −4.0544 | −.4006 | | 1.667 | 48.4 | .4841 |
| | R7 −2.9580 | .4006 | | | | .0835 |

-continued

| Element | Radius | Thickness | Spacing | Index of Refraction | Dispersion (V No.) | Axial Distance |
|---|---|---|---|---|---|---|
|  | R2 −4.0544 |  | .1116 |  |  | .4841 |
| 31 | R8 −.9081 | .0783 |  | 1.667 | 48.4 | .5957 |
|  | R9 −.9661 |  | .0004 |  |  | .6739 |
| 33 | R10 1.4767 | .0772 |  | 1.667 | 48.4 | .6743 |
|  | R11 .5603 | .5603 |  |  | .2005 |  | .7516 |
| 33 | R12 1.7875 | .0500 |  | 1.668 | 41.9 | .9521 |
|  | R13 .5542 |  | .5207 |  |  | 1.0021 |
| 37 | R14 .6539 | .1000 |  | 1.658 | 57.3 | 1.5228 |
|  | R15 −1.8453 |  | .1439 |  |  | 1.6228 |
| 39 | R16 99999.9999 | .1000 |  | 1.487 | 70.4 | 1.7667 |
|  | R17 99999.9999 |  | −.0000 |  |  | 1.8667 |
|  | Image Surface |  |  |  |  | 1.8067. |

15. The system of claim 5 wherein said system is characterized by the following construction data:

| Element | Radius | Thickness | Spacing | Index | V No. | Axial Distance |
|---|---|---|---|---|---|---|
| 17 | R1 11.3527 | .5002 |  | 1.517 | 64.2 | 0.0000 |
|  | R2 −7.5741 |  | .1221 |  |  | .5002 |
| 15 | R3 −4.1486 | .2513 |  | 1.517 | 64.2 | .6224 |
|  | R4 −45.2694 |  | 0.0000 |  |  | .8736 |
| 13 | R5 99999.9999 | 1.3504 |  | 1.517 | 64.2 | .8736 |
|  | R6 −6.0985 | −1.3504 |  |  |  | 2.2240 |
|  | R5 99999.9999 |  | 0.0000 |  |  | .8736 |
| 15 | R4 −45.2695 | −.2517 |  | 1.517 | 64.2 | .8736 |
|  | R3 −4.1486 |  | −.1221 |  |  | .6219 |
| 17 | R2 −7.5741 | −.6295 |  | 1.517 | 64.2 | .4998 |
| 19 | R7 −1.8406 | −.6295 |  | 1.517 | 64.2 | −.1297 |
| 17 | R2 −7.5741 |  | .1221 |  |  | .4998 |
| 15 | R3 −4.1486 | .2517 |  | 1.517 | 64.2 | .6219 |
|  | R4 −45.2694 |  |  |  |  | .8736. |

16. The system of claim 6 wherein said system is characterized by the following coinstruction data:

| Element | Radius | Thickness | Spacing | Index | V No. | Axial Distance |
|---|---|---|---|---|---|---|
| 17 | R1 12.7443 | .4270 |  | 1.643 | 58.0 | 0.0000 |
|  | R2 −9.5052 |  | .1780 |  |  | .4270 |
| 15 | R3 −5.3048 | .4270 |  | 1.650 | 39.2 | .6050 |
|  | R4 −58.6571 |  | 0.0000 |  |  | 1.0320 |
| 13 | R5 99999.9999 | 1.6470 |  | 1.648 | 33.9 | 1.0320 |
|  | R6 −7.6039 | 1.6470 |  | 1.648 | 33.9 | 2.679 |
|  | R5 99999.9999 |  | 0.0000 |  |  | 1.0320 |
| 15 | R4 −58.6571 | −.4270 |  | 1.650 | 39.2 | 1.0320 |
|  | R3 −5.3048 |  | −.1780 |  |  | .6050 |
| 17 | R2 −9.5052 | −.5490 |  | 1.643 | 58.0 | .4270 |
| 19 | R7 −2.4469 | −.5490 |  | 1.643 | 58.0 | −.1220 |
| 17 | R2 −9.5052 |  | .1780 |  |  | .4270 |
| 15 | R3 −5.3048 | .4270 |  | 1.650 | 39.2 | .6050 |
|  | R4 −58.6571 |  | .1010 |  |  | 1.3020. |

17. The system of claim 1 wherein said syatem is characterized by the following coinstruction data:

| Element | Radius | Thickness | Spacing | Index | V No. | Axial Distance |
|---|---|---|---|---|---|---|
| 17 | R1 24.3108 | .4841 |  | 1.667 | 48.4 | 0.0000 |
|  | R2 −4.0544 |  | .1263 |  |  | .4841 |
| 15 | R3 −2.6255 | .1988 |  | 1.658 | 50.9 | .6104 |
|  | R4 −10.8591 |  | .0005 |  |  | .8092 |
| 13 | R5 −17.8161 | .5958 |  | 1.667 | 48.4 | .8097 |
|  | R6 −4.0147 | .5958 |  |  |  | 1.4055 |
|  | R5 −17.8161 |  | −.0005 |  |  | .8097 |
| 15 | R4 −10.5891 | −.1988 |  | 1.658 | 50.9 | .8092 |
|  | R3 −2.6255 |  | −.1263 |  |  | .6104 |
| 17 | R2 −4.0544 | −.4006 |  | 1.667 | 48.4 | .4841 |
|  | R7 −2.9580 | .4006 |  |  |  | .0835 |
|  | R2 −4.0544 |  |  |  |  | .4841/ |

* * * * *